(12) United States Patent
Heimann (10) Patent No.: US 7,392,595 B2
(45) Date of Patent: Jul. 1, 2008

(54) DEVICE FOR MEASURING THE ROUNDNESS OF A RAILROAD WHEEL

(75) Inventor: Alfred Heimann, Aachen (DE)

(73) Assignee: Hegenscheidt-MFD GmbH & Co. KG, Erkelenz (DE)

( * ) Notice: Subject to any disclaimer, the term of this patent is extended or adjusted under 35 U.S.C. 154(b) by 0 days.

(21) Appl. No.: 10/540,343

(22) PCT Filed: Dec. 18, 2003

(86) PCT No.: PCT/EP03/14480

§ 371 (c)(1),
(2), (4) Date: Jan. 20, 2006

(87) PCT Pub. No.: WO2004/058554

PCT Pub. Date: Jul. 15, 2004

(65) Prior Publication Data

US 2006/0196064 A1    Sep. 7, 2006

(30) Foreign Application Priority Data

Dec. 23, 2002  (DE) ................ 102 60 816

(51) Int. Cl.
*G01B 5/20* (2006.01)
*B61K 9/12* (2006.01)

(52) U.S. Cl. ............ 33/550; 33/1 Q; 33/203; 246/169 R (58) Field of Classification Search ........... 33/1 Q, 33/338, 523.1, 651, 550–552, 203, 203.12, 33/203.15, 146, 169 R
See application file for complete search history.

(56) References Cited

U.S. PATENT DOCUMENTS

| 747,975   | A | * | 12/1903 | Johnson  | 33/287 |
| 932,076   | A | * | 8/1909  | Warren   | 33/287 |
| 943,295   | A | * | 12/1909 | Barnhard | 33/287 |
| 949,429   | A | * | 2/1910  | Harris   | 33/287 |
| 975,765   | A | * | 11/1910 | Harris   | 33/287 |

(Continued)

FOREIGN PATENT DOCUMENTS

DE    87 13 927 U    1/1988

(Continued)

OTHER PUBLICATIONS

International Search Report for PCT/EP2003/014480 (in English and German).

(Continued)

*Primary Examiner*—G. Bradley Bennett
(74) *Attorney, Agent, or Firm*—Proskauer Rose LLP (57) ABSTRACT

A measuring device on at least one rail of a railway track for measuring the roundness of an individual railway vehicle wheel during running thereof on the rail as a difference of the circumferential radius of the wheel flange top and the radius of the running tread of the railway vehicle wheel in a measuring plane can include a plurality of measuring sensors. The plurality of measuring sensors can have a lateral distance from one another and are connected to the rail in the measuring plane along the axis of rotation of the railway vehicle wheel or the set of wheels and perpendicularly to the contact surface of the respective railway vehicle wheel.

17 Claims, 5 Drawing Sheets

U.S. PATENT DOCUMENTS

| | | | | |
|---|---|---|---|---|
| 1,296,248 | A | * | 3/1919 | Williamson .................. 33/287 |
| 1,415,287 | A | * | 5/1922 | Wooster ...................... 33/651 |
| 1,927,178 | A | * | 9/1933 | Lemaire ...................... 33/287 |
| 2,531,461 | A | * | 11/1950 | Petry ........................... 33/287 |
| 2,574,474 | A | | 11/1951 | Gieskieng |
| 3,111,294 | A | * | 11/1963 | Werner ........................ 73/146 |
| 4,386,469 | A | * | 6/1983 | Lapsker ....................... 33/550 |
| 5,133,521 | A | * | 7/1992 | Gutauskas .............. 246/169 R |
| 5,555,632 | A | * | 9/1996 | Naumann et al. ............. 33/203 |
| 5,577,690 | A | * | 11/1996 | Haddox ................. 246/169 R |
| 5,660,470 | A | * | 8/1997 | Mench ........................ 33/1 Q |
| 6,564,467 | B1 | * | 5/2003 | Kay et al. ..................... 33/651 |

FOREIGN PATENT DOCUMENTS

DE    4312876 A1 * 10/1994

OTHER PUBLICATIONS

International Preliminary Examination Report for PCT/EP2003/014480 (in German).

* cited by examiner

DEVICE FOR MEASURING THE ROUNDNESS OF A RAILROAD WHEEL

The invention relates to a measuring device on at least one rail of a railway track for measuring the roundness of an individual railway vehicle wheel or the railway vehicle wheels of a set of wheels during running thereof on the rail as a difference of the circumferential radius of the wheel flange top and the radius of the running tread of the railway vehicle wheel in a measuring plane.

The roundness of a railway vehicle wheel is a criterion for the comfort of the railway vehicle. Out-of-round wheels stimulate natural vibrations of the vehicle, the bogie or the railcar body, which vibrations are experienced by the passengers as unpleasant noise and oscillations. The reasons why the railway vehicle wheels become out-of-round are complex and result from the running of the wheel running tread on the rail. Out-of-roundness is not simply produced per wheel revolution; polygons with three times, six times and more times per revolution have also been identified. Critical rotary values for a railway vehicle wheel are, measured over the total circumference, approximately 0.5 mm as a differential of two radii in the same wheel plane.

As a result of braking processes with locking, flat spots may form on the running tread of the railway vehicle wheel. These are typically only short, for example 50 mm in length, but deep in comparison to the out-of-roundness, i.e. flat spots exhibit depths of between 0.5 mm and more on the running tread. The outer circumference of the wheel flange, on the other hand, experiences almost no wear; in the case of tramway wheels, there is, at worst, slight wear. It is therefore necessary to monitor the roundness of railway vehicle wheels.

A measuring station for checking railway vehicle wheels is, for example, known from DE 693 05 664 T2. The known measuring station has two parallel rails, each of which is associated with one of the railway vehicle wheels and consists of a series of measuring chains, with each of which measuring devices, which comprise measuring sensors, are associated. The known measuring station consists of a mechanical sub-system, an electronic sub-system and a compressed air sub-system. The mechanical sub-system is formed by a plate, which holds devices that control potentiometric displacement sensors, four or more per track, which correspond to the wheel diameter, the wheel flange thickness, the wheel flange height, the wheel flange angle and the distance between wheel running treads. The electronic sub-system consists of potentiometric sensors and the processing electronics, the electronic sub-system being connected to a computer and containing an electronic processing unit, which in turn contains signal-processing units. The compressed air system creates an air passage to compressed air cylinders, which displace the measuring sensors perpendicularly when a vehicle travels over them. All of the individual devices of the known measuring station are accommodated in a watertight protective housing made of metal, as a result of which the measuring station may also be operated outdoors. The known measuring station is, in principle, located in the wheel running direction, in order to keep three measuring points in contact with the railway vehicle wheel for as long as possible. With the known measuring station, the roundness and also the flat spots of railway vehicle wheels are determined using a measuring beam, designated in the cited patent specification as measuring beam (14). The measuring beam scans the surface of the wheel flange top relative to the rail and measures as a measurement variable the displacement of the wheel running surface relative to the wheel flange top. For this purpose, the two components involved in the measurement, the rail and measuring beam, have to be very rigid in their configuration in order thus to minimize systematic errors that occur as a result of the weight of the vehicle acting on the railway vehicle wheel. This is known to result in rigid constructions and expensive foundations. The foundations and measuring beam must also be prevented from being noticeably displaced relative to each other between two calibration cycles as a result of heat influences, for example solar irradiation, which affects a railway track located outdoors.

The object of the present invention is therefore to measure the rotation and flat spots of a railway vehicle wheel such that both the influence of the weight acting on the railway vehicle wheel and the influences of temperatures play a negligible role. Moreover, the associated measuring device should be simple in its construction and require minimal maintenance.

The object is achieved by a measuring device that is arranged within a measuring path along the rail of a railway track and comprises a plurality of individual measuring sensors, which respectively have a lateral distance from one another and are connected to the rail in the measuring plane along the axis of rotation of the railway vehicle wheel or the set of wheels and perpendicularly to the contact surface of the respective railway vehicle wheel.

The running tread of the railway vehicle wheel runs on a profiled rail that is conventional for railways. Such rails have been standardized, for example, to Standards UIC 60 or S 54. As a result of the selection of a straight start-up stretch prior to the start of the measuring path, the railway vehicle wheel or the set of wheel comprising its two railway vehicle wheels is only displaced very little transversely to the rail via the measuring path. The measuring path is generally between one and two revolutions of the railway vehicle wheel. As the running tread of the railway vehicle wheel is known to have a conical profile, such displacement would be registered as a measurement error in the measurement results.

A plurality of measuring sensors are arranged along the measuring path. The bases of said sensors are fastened to the rail, and the measuring sensor contacting the wheel flange top of the railway vehicle wheel measures in each case in the measuring plane of the fastening of the measuring sensor. The measuring sensor thus measures the wheel flange height correctly if the contact point of the wheel is located precisely in the measuring plane, which is located on the track perpendicularly to the contact plane of the wheel running tread and extends through the axis of rotation of the railway vehicle wheel. The respective contact surface of a railway vehicle wheel on the rail is approximately the size of the diameter of a pea. In planes in front of and behind the measuring plane, the load of the railway vehicle wheel will bend the rail relative to the measuring plane, thus producing a measurement error, which is dependent on the wheel load, rail stiffness and the bearing conditions of the rail and sleeper on the ballast.

Initially, an individual measuring sensor is able to measure the wheel flange height of only one point on the wheel circumference. According to the characteristics of the out-of-roundness (oval or polygonal), a plurality of measuring sensors are arranged along the rails within the predetermined measuring path. For a measuring path corresponding to the wheel circumference and for an expected "triangular formation" of the wheel form, at least six measuring sensors will therefore be provided.

It is important for the arrangement of the measuring sensors within the measuring path that at least one measuring sensor must always be applied so as to measure the wheel flange. This is necessary for measuring flat spots. The mutual distance of two measuring sensors may be calculated according to the largest measured distance and the smallest diameter of the railway vehicle wheel to be measured. If a wheel having a running tread diameter of 600 mm and a measuring sensor measurement range of 30 mm is assumed, the individual measuring sensors have a mutual distance of approximately 300 mm.

Each measuring sensor comprises a measuring lever, each of which holds a roller that is roll-mounted with great precision as a feeler for contacting the railway vehicle wheel on the circumference of the wheel flange top. This roller is intended to reduce wear caused by relative movements and falsification of the measured values caused by frictional forces. The roller is located at one end of a precisely guided measuring lever, the hinge pin of which holds a high-resolution angle measurement system. The roller of the measuring lever is pressed by a return spring onto the wheel flange top. As a moving part, the mass of the measuring lever and the roller are as small as possible, the rigidity as great as possible. As the measuring force is intended to change as little as possible during a measurement, the return spring used for generating the force has to have a soft characteristic curve.

The measuring sensor is rigidly connected to the rail in the measuring plane, i.e. where the feeler roller is located, and only at this point. A calibration stop, which provides an identical zero point for all of the measuring sensors, irrespective of the heat deformation of the respective measuring levers, is also provided in the measuring plane.

Upon first contact of the measuring sensor, the railway vehicle wheel will accelerate the roller impulsively. An empty run, for stabilizing the measuring sensor as a result of its natural or additional damping and friction, is therefore provided.

The return spring must apply sufficient measuring force to overcome relatively minor contaminations of the wheel flange top. A unit for cleaning the wheel flange may optionally be provided upstream of the measuring path. Behind the peak of the railway vehicle wheel, the force of the return spring must ensure the acceleration of the measuring lever. The force of the acceleration may be determined from the inertia of the measuring lever and the feeler roller and also from the wheel diameter and the speed of the railway vehicle wheel.

The measuring path of all twelve measuring sensors, for example within the measuring path of a track, is detected at high frequency. The frequency is determined by the resolution required for the out-of-roundness and also via the diameter and speed of the railway vehicle wheel. The frequency must also be sufficiently high that the shortest flat spot may be detected with three points.

As soon as the railway vehicle wheel is contacted simultaneously with two or three measuring sensors and a measuring sensor is able to determine the wheel flange height (this is inevitably the case during the sequence), the diameters of the running tread and the wheel flange top of the railway vehicle wheel may be determined. The measured result is falsified by the influence of the load of the railway vehicle wheel, so an average load, for example, is used for the purposes of correction. The accuracy of the calculation of the diameter of the railway vehicle wheel may be increased still further in that all of the data pairs of all of the measuring sensors (with the exception of measured ranges falsified by flat spots) are taken into account in the calculation. The out-of-roundness, determined after the measurement, of the railway vehicle wheel may also be reintroduced into the calculation operation so as to have a corrective effect, thus increasing the accuracy of the calculation of the diameter. The speed of the railway vehicle wheel may also be calculated both from the signals of an individual measuring sensor, once the final diameter of the running tread of the railway vehicle wheel has been calculated, or from the time lag that occurs before two adjacent measuring sensors are able to measure the wheel flange height.

Using the circular equation and the speed of the railway vehicle wheel, the measured values of the measuring sensors may be converted such that they produce continuous rotation. The result is falsified by systematic errors, for example the wheel set load, and random errors. Nevertheless, it is sufficient to reliably recognize the signal of the flat spot and to determine the size thereof from the data thus processed. A slightly less accurate indication results, of course, from the source signal.

The measuring signal is falsified less when the contact point of the railway vehicle wheel is located in proximity to the measuring plane. In this region, the calculated "continuous rotation" is thus more accurate and may at least be used for determining a tangent to the rotation curve of the railway vehicle wheel in the measuring plane. Knowledge of the running tread diameter of the railway vehicle wheel allows the measured values that go beyond one revolution to be used for a polar diagram illustration "Wheel flange height difference over angle of rotation of the railway vehicle wheel". The measurement error, which is produced as a result of an axial wheel movement transversely to the rail via the conical form of the running surface of the railway vehicle wheel, may be reduced in that the measured values of the angle 0° and the measured values located shortly before and shortly after 360° are adjusted relative to one another by linear interpolation and correction is thus provided for the measured values of the measuring sensors located therebetween.

In addition to the construction of the measuring sensor as a rocker having its axis transverse to the rail, other constructions, such as linear guides and rail-parallel pivot points, are correspondingly also possible.

Analogue or digital measuring means for specific measured distances of 40 mm at a resolution of less than 5μ, such as encoders, incremental linear scales or magnetostrictive processes, for which there are numerous manufacturers, may be used.

The invention will be described below in greater detail with reference to an embodiment.

The drawings show in highly simplified, partly schematic form.

Figure 1:
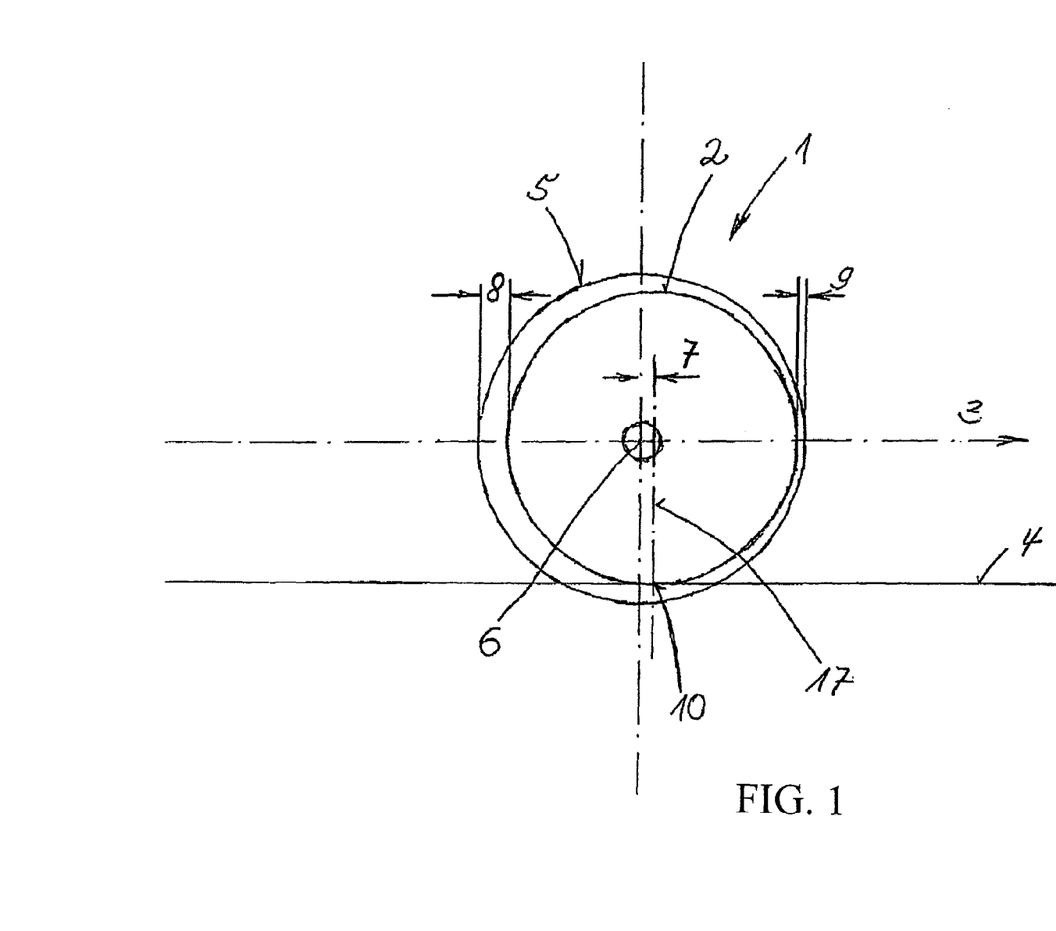
FIG. 1 the position of a railway vehicle wheel on a rail.
Figure 2:
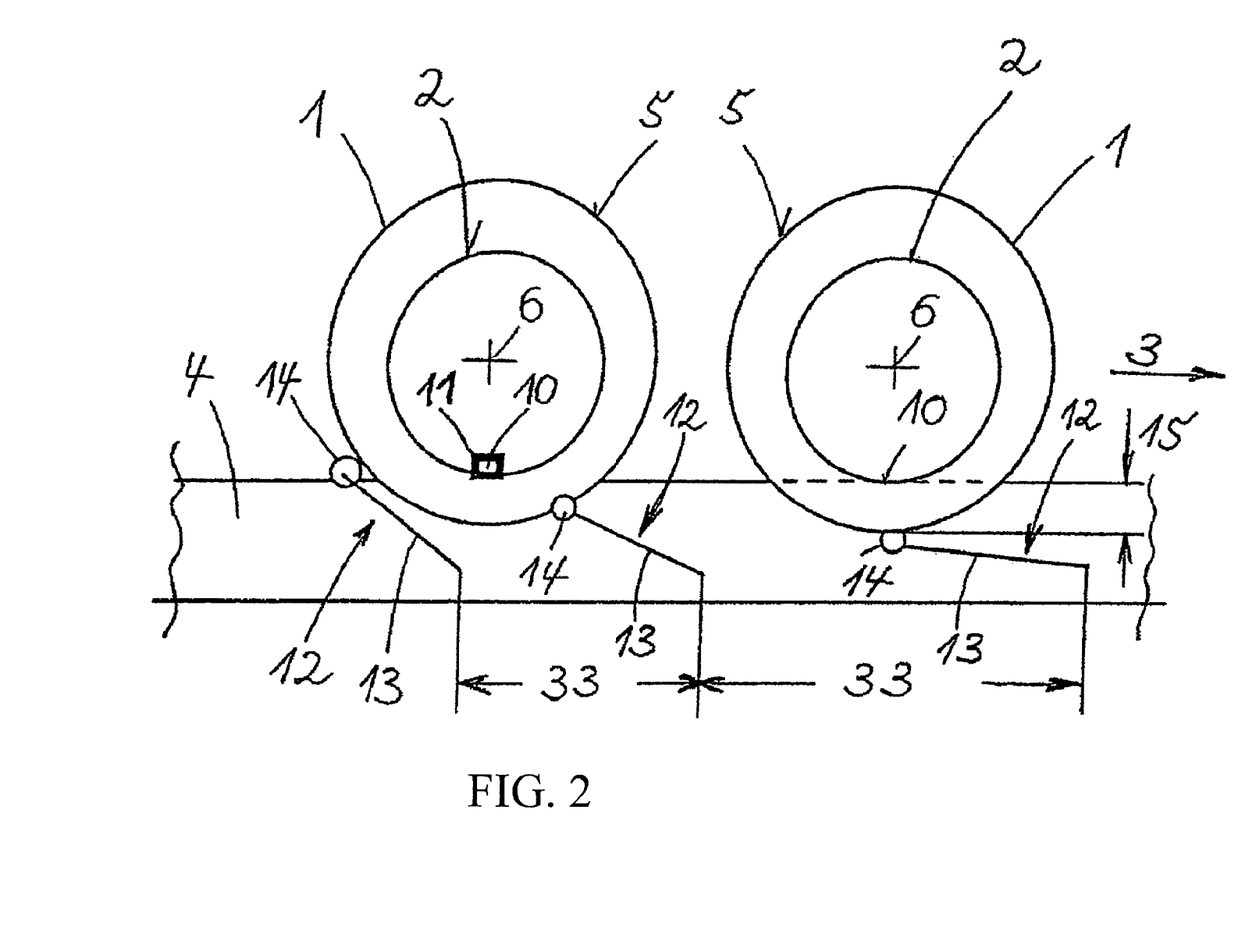
FIG. 2 the scanning of the wheel flange top of a railway vehicle wheel running over the rail.

FIG. 1 shows a railway vehicle wheel 1 at a moment when its running tread 2 is rolling on a rail 4 in direction 3. In a track, which in a known manner consists of two parallel and mutually spaced rails 4, the railway vehicle wheel 1 is held by the wheel flange 5. On running by means of the track, the railway vehicle wheel 1 rotates about its axis of rotation 6, which is perpendicular to the image plane of FIG. 1. FIG. 1 shows, for example, the out-of-roundness 7 of a railway vehicle wheel 1. The out-of-roundness 7 corresponds to the difference of the wheel flange heights 8 and 9 measured, for example, in the plane of the axis of rotation 6 in the running direction 3. In the present example of FIG. 1, the contact surface 10 of the railway vehicle wheel 1 is offset relative to the wheel axis 6 by the amount of the out-of-roundness 7. FIG. 2, for example, shows the contact surface 10 as a white point within a black frame 11. The black frame 11 illustrates the size of a flat spot relative to the normal contact surface 10 of a railway vehicle wheel 1 on a rail 4.

The railway vehicle wheel 1 of FIG. 2 rolling on the rail 4 in the running direction 3 is contacted at the wheel flange top 5 by a plurality of measuring sensors 12. Each measuring sensor 12 comprises a measuring lever 13, to the outer end of which a measuring roller 14 is in each case fastened. As may be seen in FIG. 2, the feeler measuring rollers 14 of the measuring sensors 2 each assume different horizontal positions 15, corresponding to the distance traveled in the running direction 3, on contacting the wheel flange top 5 of the railway vehicle wheel 1. The horizontal positions 15 of the feeler measuring rollers 14 correspond to the measured distance.

Figure 3:
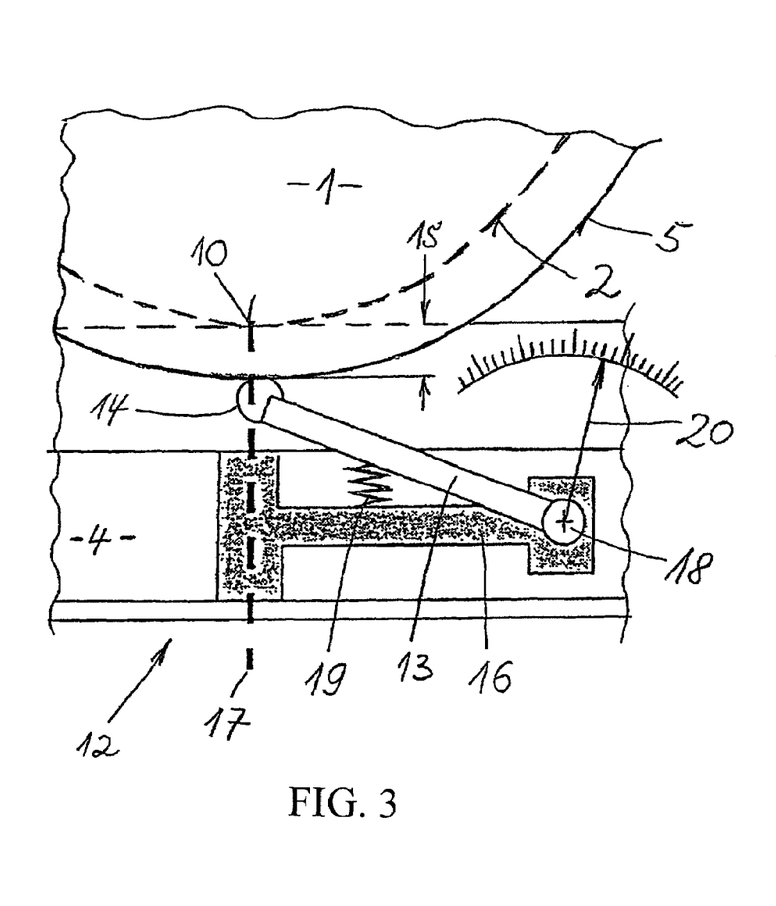
FIG. 3 a measuring sensor in a lateral view.
Figure 4:
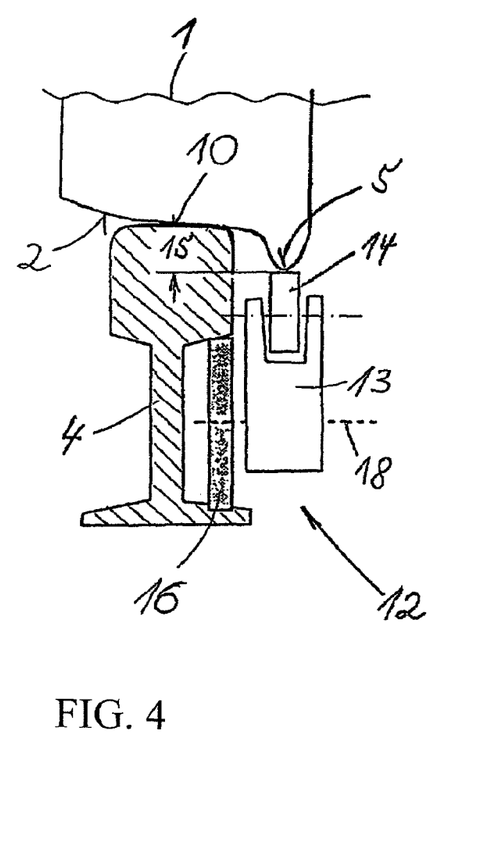
FIG. 4 a front view of the measuring sensor of FIG. 3.

Each measuring sensor 12 (FIG. 3, FIG. 4) comprises a base 16, which is fastened to the rail 4 in the measuring plane 17. The measuring plane 17 corresponds to the plane extending on the track 4 perpendicularly to the contact surface 10 and parallel to the wheel axis 6. The measuring lever 13 is rotatably connected to the base 16 via a swivel joint 18. The measuring lever 13 is also supported on the base 16 via a return spring 19. An angle sensor 20, which determines the respective horizontal position 15 of the measuring roller 14 on the wheel flange top 5 in the measuring plane 17, is also provided in the swivel joint 18.

Figure 5:
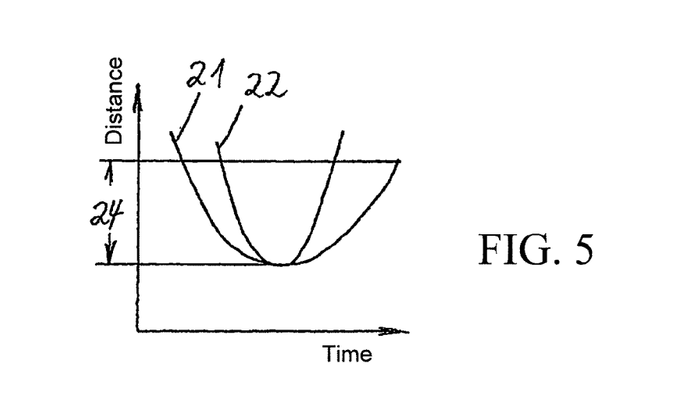
FIG. 5 a distance/time diagram of a measuring sensor.

FIG. 5 shows the signal of a measuring sensor 12 over time at different speeds of the railway vehicle wheel 1 in the direction of movement 3. The signal 21, for example, corresponds to a slow run of the railway vehicle wheel 1, and the curve 22 to a fast run of the railway vehicle wheel 1. The portion 24 in the distance/time diagram of FIG. 5 corresponds to the measured distance covered by the individual measuring sensors 12 on rolling over the wheel flange top 5.

Figure 6:
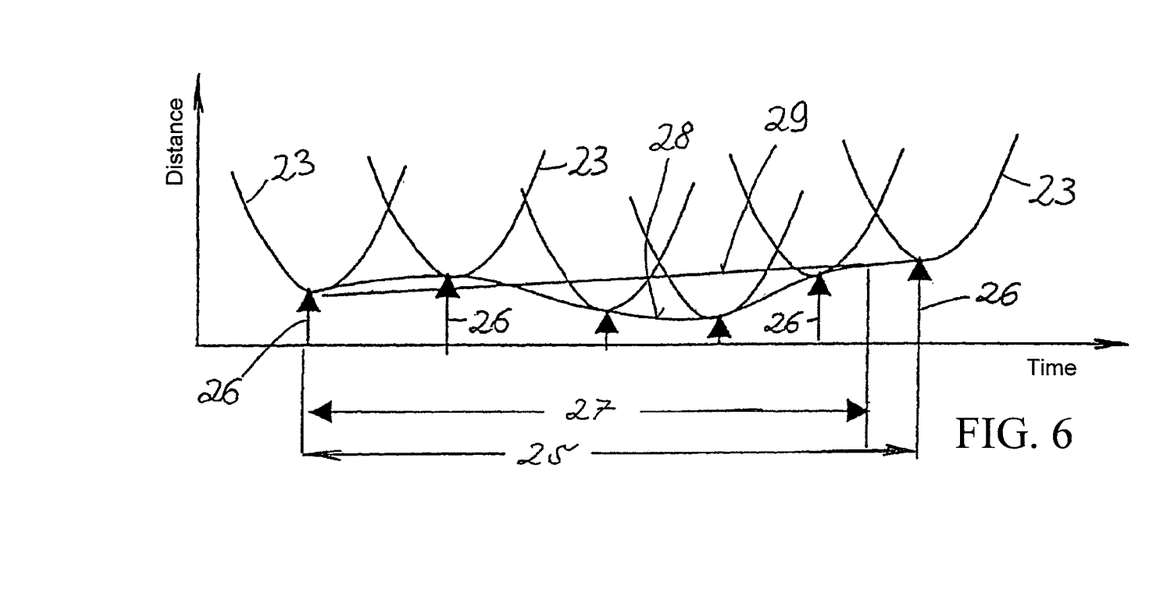
FIG. 6 a distance/time diagram of a plurality of measuring sensors within a measuring path.

In the distance/time diagram of FIG. 6, which is similar to that of FIG. 5, a plurality of measured curves 23, such as correspond to the signals 26 of the individual measuring sensors 12, are arranged next to one another over a measuring path 25. As may be seen in FIG. 6, the measuring path 25 is slightly longer than the wheel circumference 27, which a railway vehicle wheel 1 covers in a single revolution. As may also be seen in FIG. 6, the signals 26 are each of different lengths. Tangents, applied to the measured curves 23, produce an approximately sinusoidal course 28. This course 28 corresponds to the measured out-of-roundness of the railway vehicle wheel 1 over a circumference of the wheel running tread 2. In the present case, the contour curve 28 also has an incline 29. The incline 29 represents the transverse movement of the railway vehicle wheel 1 on rolling on the track toward the axis of rotation 6.

Figure 7:
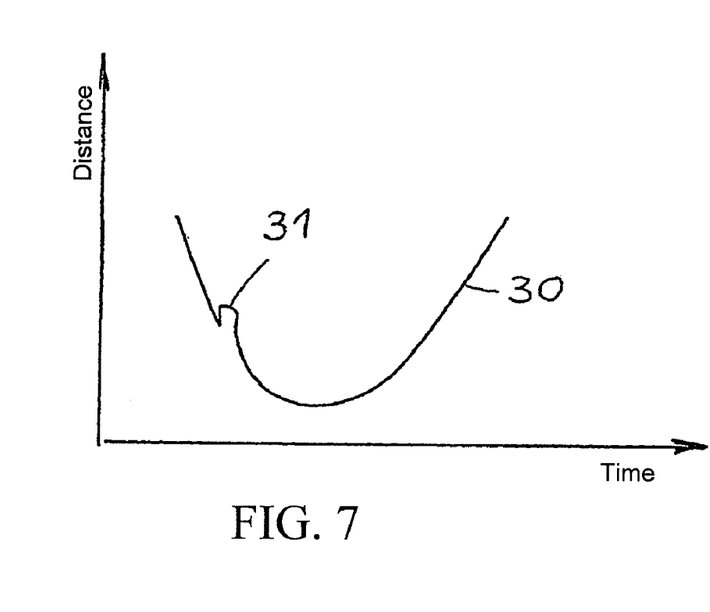
FIG. 7 a flat spot in a raw signal.
Figure 8:
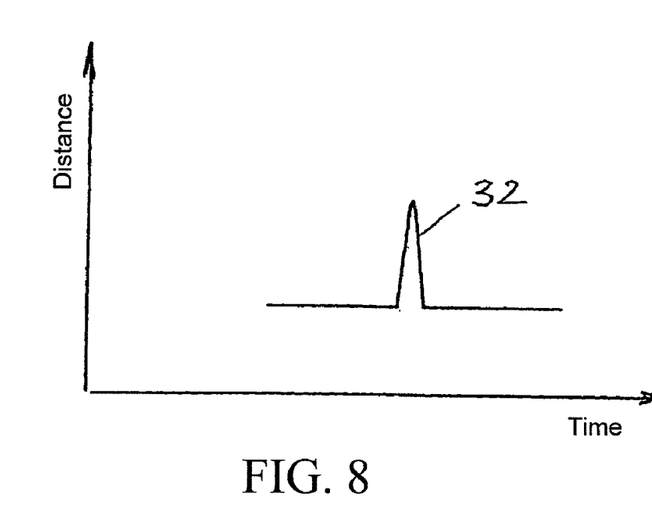
FIG. 8 a flat spot in rotation.

The measuring signal 30 of FIG. 7 shows an indentation 31. The indentation 31 is produced by a flat spot 11, which was detected on the running tread 2 of the railway vehicle wheel 1. An isolated view 32 of the flat spot 11, with respect to its position and depth on the circumference of the running tread 2, may then be seen in FIG. 8.

LIST OF REFERENCE NUMERALS

1 Railway vehicle wheel
2 Running tread
3 Running direction
4 Rail
5 Wheel flange
6 Axis of rotation
7 Out-of-roundness
8 Wheel flange height
9 Wheel flange height
10 Contact surface
11 Flat spot
12 Measuring sensor
13 Measuring lever
14 Feeler roller
15 Measured distance
16 Base
17 Measuring plane
18 Swivel joint
19 Return spring
20 Angle sensor
21 Slow run
22 Fast run
23 Measured curves
24 Measured distance
25 Measuring path
26 Individual signal
27 Wheel circumference
28 Out-of-roundness
29 Transverse movement
30 Measuring signal
31 Flat spot
32 View of flat spot
33 Mutual distance of the measuring sensors

The invention claimed is:

1. A measuring device on at least one rail of a railway track for measuring the roundness of an individual railway vehicle wheel or the railway vehicle wheels of a set of wheels during running thereof on the rail as a difference of a circumferential radius of a wheel flange top and a radius of a running tread of the railway vehicle wheel in a measuring plane, in which the measuring device, within a measuring path along the rail comprises:

a plurality of individual measuring sensors, which respectively are (i) configured as a feeler roller, (ii) have a lateral distance from one another, and (iii) are connected to the rail in the measuring plane along the axis of rotation of the railway vehicle wheel or the set of wheels and perpendicularly to the contact surface of the respective railway vehicle wheel, in a manner that during a predetermined measuring time at least two adjacent measuring sensors contact the circumference of the wheel flange top at the same time.

2. The measuring device of claim 1, wherein the measuring path is between one and two times the circumference of the running tread of the railway vehicle wheel.

3. The measuring device of claim 1, wherein within the measuring path, at least one measuring sensor contacts the circumference of the wheel flange top.

4. The measuring device of claim 1, wherein each measuring sensor further comprises:

a base that may be fastened to the rail;
a measuring lever;
a feeler roller at the outer end of the measuring lever;
a swivel joint on the base for the measuring lever;
a return spring between the feeler roller and the swivel joint; and
an angle sensor in or on the swivel joint.

5. The measuring device of claim 4, further comprising a calibration stop.

6. The measuring device of claim 1, further comprising an evaluation device to which each individual measuring sensor can be connected.

7. The measuring device of claim 6, wherein the evaluation device comprises subordinate means for determining:
- the roundness of the railway vehicle wheel with precise values in the measuring points of the sensors and with tangents in the measuring points,
- the wheel diameter in the running tread,
- the height of the wheel flange in the contact surface of the running tread and
- the number, the position and respective depth of flat spots in the running surface.

8. The measuring device of claim 7, wherein the evaluation device comprises a subordinate means for determining the transverse displacement of the railway vehicle wheel or the railway vehicle wheels of a set of wheels on passing through the measuring path.

9. The measuring device of claim 7, wherein the evaluation device comprises a subordinate means that recursively corrects the diameter of the railway vehicle wheel or the railway vehicle wheels of a set of wheels with a measured deviations from the roundness of the respective railway vehicle wheel.

10. The measuring device of claim 4, wherein a dirt scraper is provided on the feeler roller.

11. The measuring device of claim 2, wherein within the measuring path, at least one measuring sensor contacts the circumference of the wheel flange top.

12. The measuring device of claim 2, wherein each measuring sensor further comprises:
- a base that may be fastened to the rail;
- a measuring lever;
- a feeler roller at the outer end of the measuring lever;
- a swivel joint on the base for the measuring lever;
- a return spring between the feeler roller and the swivel join; and
- an angle sensor in or on the swivel joint.

13. The measuring device of claim 3, wherein each measuring sensor further comprises:
- a base that may be fastened to the rail;
- a measuring lever;
- a feeler roller at the outer end of the measuring lever;
- a swivel joint on the base for the measuring lever;
- a return spring between the feeler roller and the swivel join; and
- an angle sensor in or on the swivel joint.

14. The measuring device of claim 2, further comprising an evaluation device to which each individual measuring sensor can be connected.

15. The measuring device of claim 3, further comprising an evaluation device to which each individual measuring sensor can be connected.

16. The measuring device of claim 4, further comprising an evaluation device to which each individual measuring sensor can be connected.

17. The measuring device of claim 5, further comprising an evaluation device to which each individual measuring sensor can be connected.

* * * * *

UNITED STATES PATENT AND TRADEMARK OFFICE
CERTIFICATE OF CORRECTION

PATENT NO.        : 7,392,595 B2
APPLICATION NO. : 10/540343
DATED             : July 1, 2008
INVENTOR(S)       : Heimann It is certified that error appears in the above-identified patent and that said Letters Patent is hereby corrected as shown below:

In claim 12, column 8, line 5, delete "swivel join" and replace it with -- swivel joint --
In claim 13, column 8, line 14, delete "swivel join" and replace it with -- swivel joint --

Signed and Sealed this

Nineteenth Day of August, 2008

JON W. DUDAS
*Director of the United States Patent and Trademark Office*